(12) United States Patent
Wang et al.

(10) Patent No.: US 9,930,700 B2
(45) Date of Patent: Mar. 27, 2018

(54) CONFIGURABLE RANDOM ACCESS INITIAL POWER LEVEL SELECTION

(71) Applicant: QUALCOMM Incorporated, San Diego, CA (US)

(72) Inventors: Renqiu Wang, San Diego, CA (US); Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/132,988

(22) Filed: Apr. 19, 2016

(65) Prior Publication Data

US 2016/0316490 A1 Oct. 27, 2016

Related U.S. Application Data

(60) Provisional application No. 62/150,837, filed on Apr. 21, 2015.

(51) Int. Cl.
*H04B 7/00* (2006.01)
*H04W 74/08* (2009.01)
(Continued)

(52) U.S. Cl.
CPC ...... *H04W 74/0833* (2013.01); *H04B 17/318* (2015.01); *H04W 4/005* (2013.01);
(Continued)

(58) Field of Classification Search
CPC . H04W 74/0833; H04W 76/02; H04W 4/005; H04W 52/0245; H04W 52/146;
(Continued)

(56) References Cited

U.S. PATENT DOCUMENTS

| 2009/0088160 | A1* | 4/2009 | Pani | H04W 36/30 455/436 |
| 2010/0255847 | A1* | 10/2010 | Lee | H04W 52/50 455/436 |

(Continued)

FOREIGN PATENT DOCUMENTS

EP 2475205 A1 7/2012

OTHER PUBLICATIONS

ISA/EP, International Search Report and Written Opinion of the International Searching Authority, Int'l. App. No. PCT/US2016/028389, Jun. 22, 2016, European Patent Office, Rijswijk, NL, 12 pgs.

*Primary Examiner* — Khai M Nguyen
(74) *Attorney, Agent, or Firm* — Holland & Hart LLP

(57) ABSTRACT

Methods, systems, and devices are described for initial power level selection on a physical random access channel in a wireless communications network. Initial power level selection may account for, or be based on, one or more channel conditions associated with the physical random access channel. Initial power level selection may be based on signaling of available initial power transmission levels and a reference signal received power measurement. The described features may be implemented as coverage enhancement techniques, for example, for machine-type communication (MTC).

26 Claims, 14 Drawing Sheets

(51) Int. Cl.
*H04B 17/318* (2015.01)
*H04W 76/02* (2009.01)
*H04W 52/02* (2009.01)
*H04W 4/00* (2018.01)
*H04W 52/14* (2009.01)
*H04W 52/50* (2009.01)
*H04W 52/36* (2009.01)

(52) U.S. Cl.
CPC ..... *H04W 52/0245* (2013.01); *H04W 52/146* (2013.01); *H04W 52/50* (2013.01); *H04W 76/02* (2013.01); *H04W 52/367* (2013.01); *Y02B 60/50* (2013.01)

(58) Field of Classification Search
CPC .. H04W 52/367; H04W 52/50; H04B 17/318; Y02B 60/50
USPC .................................................. 455/522, 517
See application file for complete search history.

(56) References Cited

U.S. PATENT DOCUMENTS

| | | | |
|---|---|---|---|
| 2013/0035084 A1 | 2/2013 | Song et al. | |
| 2013/0114434 A1* | 5/2013 | Muruganathan | H04W 16/14 370/252 |
| 2013/0329631 A1* | 12/2013 | Alam | H04W 52/362 370/328 |
| 2014/0328327 A1* | 11/2014 | Xiao | H04W 36/0088 370/332 |
| 2015/0078188 A1* | 3/2015 | Xu | H04W 52/367 370/252 |
| 2016/0345325 A1* | 11/2016 | Liu | H04W 74/006 |
| 2016/0353440 A1* | 12/2016 | Lee | H04W 4/005 |

\* cited by examiner

CONFIGURABLE RANDOM ACCESS INITIAL POWER LEVEL SELECTION

CROSS REFERENCES

The present application for patent claims priority to U.S. Provisional Patent Application No. 62/150,837 by Wang et al., entitled "Configurable Random Access Initial Power Level Selection," filed Apr. 21, 2015, assigned to the assignee hereof.

BACKGROUND

Field of Disclosure

The following relates generally to wireless communication, and more specifically to techniques for random access power level selection for machine type communication (MTC) devices.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems (e.g., a Long Term Evolution (LTE) system).

By way of example, a wireless multiple-access communications system may include a number of base stations, each simultaneously supporting communication for multiple communication devices, which may be otherwise known as user equipment (UEs). A base station may communicate with the communication devices on downlink channels (e.g., for transmissions from a base station to a UE) and uplink channels (e.g., for transmissions from a UE to a base station).

Some types of wireless devices may provide for automated communication. Automated wireless devices may include those implementing Machine-to-Machine (M2M) communication or Machine Type Communication (MTC). M2M and/or MTC may refer to data communication technologies that allow devices to communicate with one another or a base station without human intervention. For example, M2M and/or MTC may refer to communications from devices that integrate sensors or meters to measure or capture information and relay that information to a central server or application program that can make use of the information or present the information to humans interacting with the program or application.

MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some wireless communications systems, including those employing coverage enhancement techniques, certain channels may have an initial transmission followed by one or more repeated transmissions based on a response, or lack thereof, to the initial transmission. For example, random access transmissions may be initially transmitted, and then retransmitted in the event that a random access response (RAR) is not received. Additionally, power levels for initial transmissions and for certain repeated transmissions may be varied to enhance likelihood of receipt of the transmissions. Efficient determination and adjustment of such power levels may be desirable to provide relatively efficient network access for MTC devices.

SUMMARY

The described features generally relate to one or more systems, methods, and apparatuses for initial power level selection on a physical random access channel in a wireless communications network. Initial power level selection may account for, or be based on, one or more channel conditions associated with the physical random access channel. Additionally or alternatively, initial power level selection may be based on signaling of available initial power transmission levels and a reference signal received power measurement.

A method of wireless communication is described. The method may include receiving signaling indicative of a set of initial transmission power levels, selecting an initial transmission power level from the set based at least in part on a reference signal received power (RSRP) measurement, and transmitting a random access channel (RACH) message utilizing the initial transmission power level.

An apparatus for wireless communication is described. The apparatus may include means for receiving signaling indicative of a set of initial transmission power levels, means for selecting an initial transmission power level from the set based at least in part on a reference signal received power (RSRP) measurement, and means for transmitting a random access channel (RACH) message utilizing the initial transmission power level.

A further apparatus for wireless communication is described. The apparatus may include a processor, memory in electronic communication with the processor, and instructions stored in the memory, wherein the instructions are executable by the processor to receive signaling indicative of a set of initial transmission power levels, select an initial transmission power level from the set based at least in part on a reference signal received power (RSRP) measurement, and transmit a random access channel (RACH) message utilizing the initial transmission power level.

A non-transitory computer-readable medium storing code for wireless communication is described. The code may include instructions executable to receive signaling indicative of a set of initial transmission power levels, select an initial transmission power level from the set based at least in part on a reference signal received power (RSRP) measurement, and transmit a random access channel (RACH) message utilizing the initial transmission power level.

Some examples of the method, apparatuses, or non-transitory computer-readable medium described above may further include receiving signaling indicative of a set of RSRP threshold values, and comparing the RSRP measurement to the RSRP threshold values, wherein the initial transmission power is selected based at least in part on the comparison. Additionally or alternatively, in some examples the set of RSRP threshold values comprises a number of elements that is equal to a number of elements in the set of initial transmission power levels minus one. In some examples, the set of RSRP threshold values may be uniquely mapped to the set of initial transmission power levels.

In some examples of the method, apparatuses, or non-transitory computer-readable medium described above, the RSRP threshold values are based at least in part on a probability distribution function associated with the RSRP measurement or the initial transmission power levels in the set. Additionally or alternatively, in some examples the set of initial transmission power levels comprises a subset of available transmission power levels, and wherein a number of elements in the subset of available transmission power levels is less than or equal to a total number of available transmission power levels.

In some examples of the method, apparatuses, or non-transitory computer-readable medium described above, the selected initial transmission power level is inversely proportional to the RSRP measurement. Additionally or alternatively, some examples may include determining that the transmission of the RACH message utilizing the initial transmission power level failed, and selecting a subsequent transmission power level from a subset of the set of initial transmission power levels, wherein the subset comprises transmission power levels that are greater than the selected initial transmission power level, and transmitting a subsequent RACH message utilizing the subsequent transmission power level.

Some examples of the method, apparatuses, or non-transitory computer-readable medium described above may further include transitioning from an idle mode to a connection mode, and receiving signaling indicative of a subsequent set of initial transmission power levels, wherein the subsequent set of initial transmission power levels is the same as or different from the set of initial transmission power levels and is based at least in part on a prior successful RACH message transmission. Additionally or alternatively, some examples may include receiving signaling indicative of a set of RSRP threshold values based at least in part on the subsequent set of initial transmission power levels, and wherein the set of RSRP threshold values is the same as or different from an initial set of RSRP threshold values established prior to the successful RACH message transmission.

A method of wireless communication is described. The method may include receiving signaling indicative of a set of RSRP threshold values, selecting an initial transmission power level from a set of available transmission power levels based at least in part on a comparison between a reference signal received power (RSRP) measurement and the set of RSRP threshold values, and transmitting a random access channel (RACH) message utilizing the initial transmission power level.

An apparatus for wireless communication is described. The apparatus may include means for receiving signaling indicative of a set of RSRP threshold values, means for selecting an initial transmission power level from a set of available transmission power levels based at least in part on a comparison between a reference signal received power (RSRP) measurement and the set of RSRP threshold values, and means for transmitting a random access channel (RACH) message utilizing the initial transmission power level.

A further apparatus for wireless communication is described. The apparatus may include a processor, memory in electronic communication with the processor, and instructions stored in the memory, wherein the instructions are executable by the processor to receive signaling indicative of a set of RSRP threshold values, select an initial transmission power level from a set of available transmission power levels based at least in part on a comparison between a reference signal received power (RSRP) measurement and the set of RSRP threshold values, and transmit a random access channel (RACH) message utilizing the initial transmission power level.

A non-transitory computer-readable medium storing code for wireless communication is described. The code may include instructions executable to receive signaling indicative of a set of RSRP threshold values, select an initial transmission power level from a set of available transmission power levels based at least in part on a comparison between a reference signal received power (RSRP) measurement and the set of RSRP threshold values, and transmit a random access channel (RACH) message utilizing the initial transmission power level.

A method of wireless communication is described. The method may include determining a set of initial transmission power levels, transmitting signaling indicative of the set of initial transmission power levels, and receiving a random access channel (RACH) message transmitted according to an initial transmission power level selected from the set of initial transmission power levels.

An apparatus for wireless communication is described. The apparatus may include means for determining a set of initial transmission power levels, means for transmitting signaling indicative of the set of initial transmission power levels, and means for receiving a random access channel (RACH) message transmitted according to an initial transmission power level selected from the set of initial transmission power levels.

A further apparatus for wireless communication is described. The apparatus may include a processor, memory in electronic communication with the processor, and instructions stored in the memory, wherein the instructions are executable by the processor to determine a set of initial transmission power levels, transmit signaling indicative of the set of initial transmission power levels, and receive a random access channel (RACH) message transmitted according to an initial transmission power level selected from the set of initial transmission power levels.

A non-transitory computer-readable medium storing code for wireless communication is described. The code may include instructions executable to determine a set of initial transmission power levels, transmit signaling indicative of the set of initial transmission power levels, and receive a random access channel (RACH) message transmitted according to an initial transmission power level selected from the set of initial transmission power levels.

In some examples of the method, apparatuses, or non-transitory computer-readable medium described above, determining the set of initial transmission power levels comprises selecting a subset from a set of available transmission power levels. Additionally or alternatively, some examples may include determining a set of reference signal received power (RSRP) threshold values, and transmitting signaling indicative of the set of RSRP threshold values, wherein the set of RSRP values corresponds to the set of initial transmission power levels.

In some examples of the method, apparatuses, or non-transitory computer-readable medium described above, the set of RSRP threshold values are based at least in part on a probability distribution function associated with RSRP measurements or the set of initial transmission power levels. Additionally or alternatively, in some examples the set of RSRP threshold values comprises a number of elements that is equal to a number of elements in the set of initial transmission power levels minus one.

In some examples of the method, apparatuses, or non-transitory computer-readable medium described above, the set of initial transmission power levels comprises a subset of available transmission power levels, and wherein a number of elements in the subset is of available transmission power levels less than or equal to a total number of available transmission power levels. Additionally or alternatively, some examples may include establishing an radio resource control (RRC) connection with a user equipment, determining a subsequent set of initial transmission power levels that is the same as or different from the set of initial transmission power levels and is based at least in part on a prior successful RACH message transmission, and transmitting signaling indicative of the subsequent set of initial transmission power levels.

Some examples of the method, apparatuses, or non-transitory computer-readable medium described above may further include determining a set of reference signal received power (RSRP) threshold values, wherein the set of RSRP threshold values is the same as or different from an initial set of RSRP threshold values established prior to the successful RACH message transmission, and transmitting signaling indicative of the set of RSRP threshold values.

A method of wireless communication is described. The method may include determining a set of RSRP threshold values based at least in part a set of available transmission power levels, and transmitting signaling indicative of the set of RSRP threshold values to a user equipment.

An apparatus for wireless communication is described. The apparatus may include means for determining a set of RSRP threshold values based at least in part a set of available transmission power levels, and means for transmitting signaling indicative of the set of RSRP threshold values to a user equipment.

A further apparatus for wireless communication is described. The apparatus may include a processor, memory in electronic communication with the processor, and instructions stored in the memory, wherein the instructions are executable by the processor to determine a set of RSRP threshold values based at least in part a set of available transmission power levels, and transmit signaling indicative of the set of RSRP threshold values to a user equipment.

A non-transitory computer-readable medium storing code for wireless communication is described. The code may include instructions executable to determine a set of RSRP threshold values based at least in part a set of available transmission power levels, and transmit signaling indicative of the set of RSRP threshold values to a user equipment.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
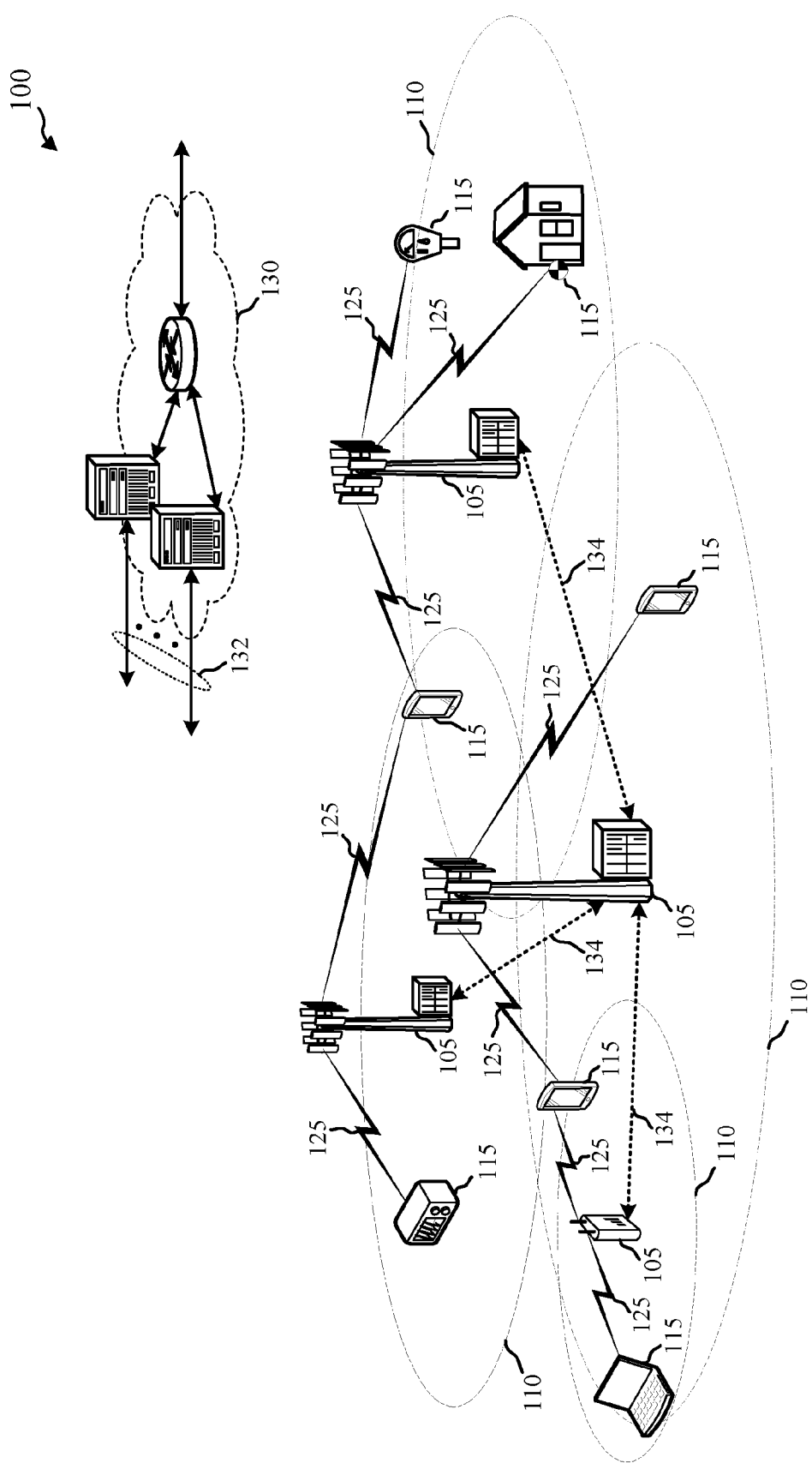
FIG. 1 illustrates an example of a wireless communications system for random access power level selection for machine type communication (MTC) devices in accordance with various aspects of the present disclosure.

The described features generally relate to improved systems, methods, or apparatuses for random access to a wireless communications network for Machine Type Communication (MTC) devices. In some examples, an initial power level selection for a random access attempt may be based on signaling of available initial power transmission levels and a reference signal received power (RSRP) measurement. A user equipment (UE), which may be an MTC device, may measure RSRP and select an initial random access transmission power based on the measured RSRP and the signaled available initial power transmission power levels. The available initial power transmission levels may be selected to provide an improved likelihood of a successful random access attempt, and enhance system efficiency through reduced attempts that have low likelihood of success or through reduced attempts made at a higher power than necessary to provide a successful random access attempt.

Such techniques, as will be discussed in more detail below, may be desirable in deployments of MTC devices. As mentioned above, some wireless systems may provide for automated communication such as MTC or Machine-to-Machine (M2M) communication. M2M or MTC may refer to technologies that communicate without human intervention. In some cases, MTC devices may have limited capabilities. For example, while some MTC devices may have broadband capacity, other MTC devices may be limited to narrowband communications. This narrowband limitation may, for example, interfere with the ability of an MTC device to receive control channel information or transmitted reference signals using the full bandwidth served by a base station. In some wireless communication systems, such as those employing Long Term Evolution (LTE) techniques, an MTC device having limited bandwidth capability (or another device with similar capabilities) may be referred to as a category 0 device.

In some cases, MTC devices may have reduced peak data rates (e.g., a maximum transport block size may be 1000 bits). Additionally, an MTC device may have rank one transmission and one antenna for receiving. This may limit an MTC device to half-duplex communication (i.e., the device may not be capable of simultaneously transmitting and receiving). If an MTC device is half-duplex, it may have relaxed switching time (e.g., from transmission (Tx) to reception (Rx) or vice versa). For example, a nominal switching time for a non-MTC device may be 20 μs while a switching time for an MTC device may be 1 ms. MTC enhancements (eMTC) in a wireless system may allow narrowband MTC devices to effectively operate within wider system bandwidth operations (e.g., 1.4/3/5/10/15/20 MHz). For example, an MTC device may support 1.4 MHz bandwidth (i.e., 6 resources blocks in an LTE system). In some instances, coverage enhancements of such MTC devices may be employed to provide more reliable communications. Coverage enhancements may include, for example, power boosting (e.g., of up to 15 dB), and bundling of Transmission Time Intervals (TTIs) to provide redundant versions of a transmission.

Bundling of TTIs to provide a certain number of redundant versions of a transmission may be used to enhance coverage for certain channels, such as the physical uplink shared channel (PUSCH), the physical downlink shared channel (PDSCH), an enhanced physical downlink control channel (ePDCCH), the physical random access channel (PRACH), the physical uplink control channel (PUCCH), or the like. For instance, various physical channels—including the PRACH and associated messages—may have multiple redundant transmissions from a wireless communications device. In some cases, the number of redundant versions can be on the order of tens of subframes, and different channels may have different redundancy levels.

Furthermore, as mentioned, coverage enhancements may include power boosting, in which an MTC device may transmit using higher transmission power levels, which may include RACH transmissions. Additionally, according to established random access techniques, open loop power control may be used for random access attempts where an initial random access transmission may be made. If a random access response (RAR) is not received, a subsequent random access transmission at a higher power level may be made. For example, a UE may attempt random access to a network by successively transmitting random access requests until a RAR is received. In examples where an MTC device is operating according to coverage enhancement techniques, one or more random access attempts may be made at each repetition power level, and each random access attempt may include one or more redundant versions of a random access request. For example, a first random access attempt may be made at a first power level (which may include one or more redundant transmissions of the random access message according to coverage enhancement techniques), followed by a second random access attempt made at a second higher power level (assuming no RAR is received), and so on until a maximum transmit power level is reached. A scenario may include a maximum of three power levels of random access transmissions, and in some examples different numbers of redundant transmissions may be provided for the different power levels.

The power level for the initial random access transmission may be determined, in some deployments, based on a reference signal received power (RSRP) measurement made by a UE. As noted above, MTC devices may have limited capabilities for receiving transmissions, and in some cases may further be located in areas that have poor coverage (e.g., in a basement of a building). The RSRP measurements at a UE may thus be used to select a random access transmission power level, so as to avoid having to cycle through multiple random access attempts at relatively low transmit power levels that have a low likelihood of success. An incorrect measurement of RSRP, however, may lead to waste of power (in the case of an underestimation of the RSRP) or increased access time (in the case of an overestimation of the RSRP). Furthermore, due to reduced capabilities of MTC devices and/or MTC devices in locations having poor coverage, RSRP measurements may be relatively inaccurate.

For example, in some deployments MTC devices may have RSRP measurement signal to noise ratios of +/−7 dB in normal conditions and up on +/−10 dB in extreme condition. Furthermore, according to some open loop power control techniques for random access attempts, random access power levels may have 5 dB granularity, and an RSRP measurement would need to be within +/−2.5 dB at 90% confidence in order to select the correct power level. Thus in such examples, an RSRP measurement at a UE may not be accurate enough to select the correct power level. For example, a probability density function (PDF) associated with an RSRP measurement having a relatively high signal to noise ratio (e.g., a 0 dB SNR) may be relatively sharp and narrow, while a PDF associated with an RSRP measurement having a relatively low SNR (e.g., a −10 or −15 dB SNR) may be relatively low and wide, such that substantial overlap of probabilities for different SNRs may be present. In cases where a transmission power for an initial random access transmission is based on RSRP, relatively low SNR measurements may result in an inaccurate selection of an initial transmission power. In some examples, a set of available initial transmission powers may be provided to a UE, with one of the initial transmission powers selected based on an RSRP measurement as will be discussed in more detail below. In certain examples, the number of available initial transmission powers in the set may be less than a total number of available transmission powers, so as to provide a same initial power level for RSRP measurements below a set level. For example, if the total number of available transmission powers include 0 dBm, 5 dBm, 10 dBm, and 15 dBm for RSRP measurements of 0 dB, −5 dB, −10 dB, and −15 dB, respectively, a same initial transmission power of 15 dBm may be selected for any RSRP measurement at or below −7.5 dB.

In some cases, a UE may increase its transmit power from the initial transmit power level with each successive repetition of the random access transmission according to power ramp-up techniques associated with open loop power control. So the UE may transmit at the specified initial power for a first random access attempt, and at a higher power for subsequent attempts. In some examples, a base station may determine a power level used for transmission of a successful random access message, and communicate a subsequent set of initial transmission power levels for the UE to use in subsequent random access attempts. Such techniques may be advantageous for MTC devices that may not be mobile and thus likely to have relatively little change in channel conditions between successive random access attempts. A UE may be limited to an overall maximum number of attempts before reaching a "backoff" setting. Additionally or alternatively, the UE may be configurable to repeat the progression through the levels until receiving a RAR.

Although coverage enhancement techniques—including redundant transmissions and power boosting—may typically be employed with MTC devices, other types of user equipment (UE) may likewise utilize or benefit from such techniques. Accordingly, those skilled in the art will recognize that the described coverage enhancement techniques are not limited to MTC uses.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For example, although the scenarios are described with respect to MTC devices, the techniques described herein may be used with a variety of other type wireless communications devices and systems. In addition, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the present disclosure. The system 100 includes base stations 105, at least one user equipment (UE) 115, and a core network 130. The core network 130 may provide user authentication, access authorization, tracking, internet protocol (IP) connectivity, and other access, routing, or mobility functions. The base stations 105 interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X2, etc.), which may be wired or wireless communication links. A UE 115 may be an MTC device such as described above.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro or small cell base stations). There may be overlapping geographic coverage areas 110 for different technologies In some examples, the wireless communications system 100 is a Long Term Evolution (LTE)/LTE-Advanced (LTE-A) network. In LTE/LTE-A networks, the term evolved node B (eNB) may be generally used to describe the base stations 105, while the term UE may be generally used to describe the UEs 115. The wireless communications system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs 115 with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARD) to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The UEs 115 may be dispersed throughout the wireless communications system 100, and each UE 115 may be stationary or mobile. As noted above, a UE may be an MTC device, although the techniques described herein may be used in a variety of systems. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

Some types of UEs 115 may provide for automated communication. Automated wireless devices may include those implementing MTC or M2M communication. MTC may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. As noted, some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. In some cases, MTC devices may be configured for regular transmission intervals that alternate with sleep intervals.

The communication links 125 shown in wireless communications system 100 may include uplink (UL) transmissions from a UE 115 to a base station 105, or downlink (DL) transmissions, from a base station 105 to a UE 115. The downlink transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more UL CCs for carrier aggregation. Carrier aggregation may be used with both FDD and TDD component carriers.

LTE systems may utilize orthogonal frequency division multiple access (OFDMA) on the DL and single carrier frequency division multiple access (SC-FDMA) on the UL. OFDMA and SC-FDMA partition the system bandwidth into multiple (K) orthogonal subcarriers, which are also commonly referred to as tones or bins. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

Data may be divided into logical channels, transport channels, and physical layer channels. Channels may also be classified into Control Channels and Traffic Channels. Logical control channels may include paging control channel (PCCH) for paging information, broadcast control channel (BCCH) for broadcast system control information, multicast control channel (MCCH) for transmitting multimedia broadcast multicast service (MBMS) scheduling and control information, dedicated control channel (DCCH) for transmitting dedicated control information, common control channel (CCCH) for random access information, DTCH for dedicated UE data, and multicast traffic channel (MTCH), for multicast data. DL transport channels may include broadcast channel (BCH) for broadcast information, a downlink shared channel (DL-SCH) for data transfer, paging channel (PCH) for paging information, and multicast channel (MCH) for multicast transmissions. UL transport channels may include random access channel (RACH) for access and UL shared channel (UL-SCH) for data. DL physical channels may include physical broadcast channel (PBCH) for broadcast information, physical control format indicator channel (PCFICH) for control format information, physical downlink control channel (PDCCH) for control and scheduling information, physical HARQ indicator channel (PH-ICH) for HARQ status messages, physical downlink shared channel (PDSCH) for user data and physical multicast channel (PMCH) for multicast data. UL physical channels may include physical random access channel (PRACH) for access messages, PUCCH for control data, and physical UL shared channel (PUSCH) for user data.

In some cases a TTI (e.g., 1 ms in LTE, the equivalent of one subframe) may be defined as the smallest unit of time in which a base station 105 may schedule a UE 115 for UL or DL transmission. For example, if a UE 115 is receiving DL data, then during each 1 ms interval a base station 105 may assign resources and indicate (via PDCCH transmissions) to the UE 115 where to look for its DL data. TTI bundling may be used to improve a communication link 125 in relatively poor radio conditions or in deployments where MTC devices may operate using a relatively narrow bandwidth or are in a coverage limited locations, such as a basement or deep within a building. TTI bundling may involve sending multiple redundant copies of the same information in a group of consecutive or non-consecutive subframes (TTIs) rather than waiting for feedback indicating data was not received before retransmitting redundancy versions.

According to the present disclosure, a wireless device, such as a UE 115, may be configured with a set of initial transmit powers for use in transmitting an initial transmission, such as a random access message. The device may then identify an initial transmission power level for random access requests based on the set of initial transmit powers and, for example, an RSRP.

Figure 2:
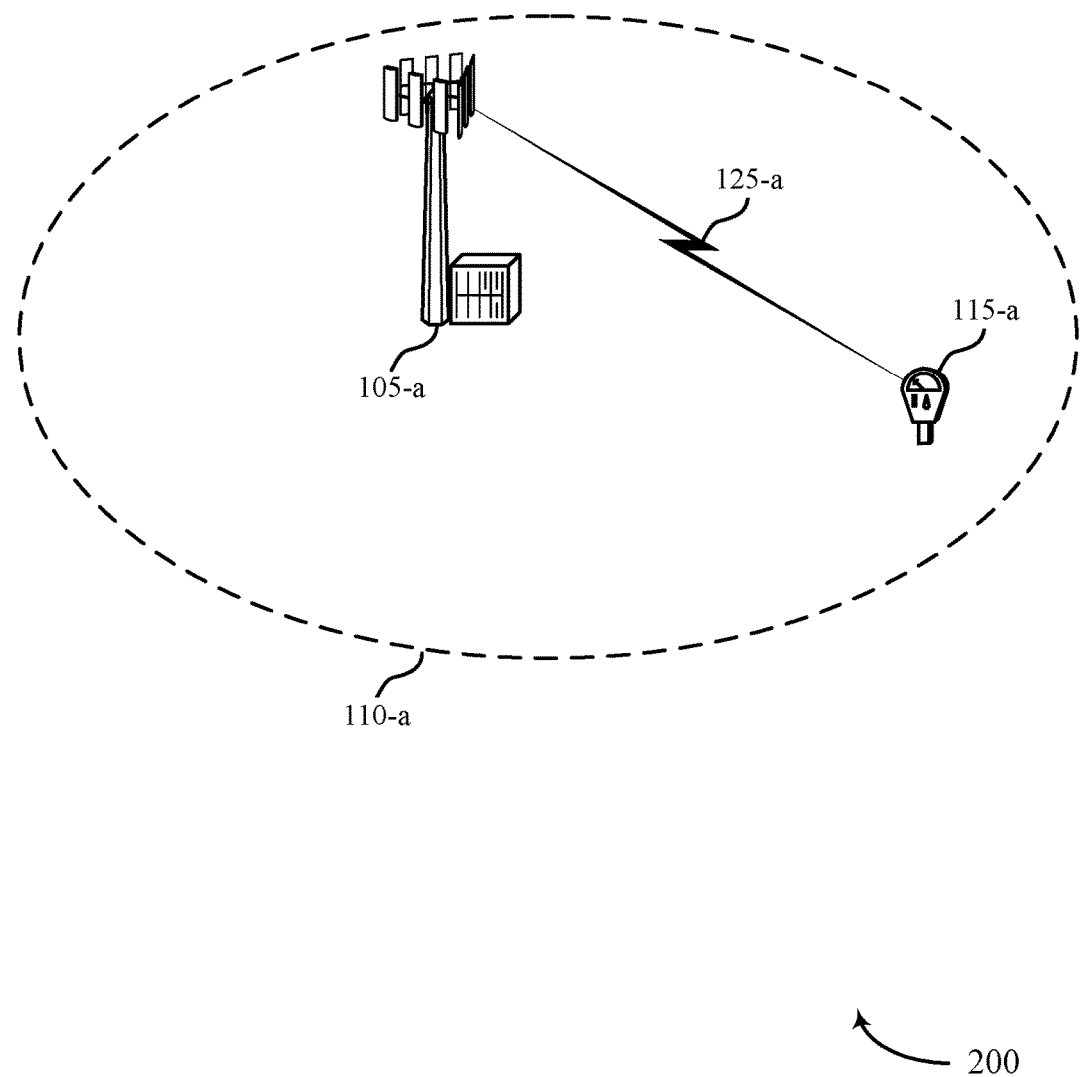
FIG. 2 illustrates an example of a wireless communications subsystem for MTC devices in accordance with various aspects of the present disclosure.

FIG. 2 illustrates an example of a wireless communications subsystem 200 for configuration of random access initial power, in accordance with various aspects of the present disclosure. Wireless communications subsystem 200 may include UE 115-a, which may be an example of a UE 115 described with reference to FIG. 1. For example, as illustrated, UE 115-a may be an MTC device. Wireless communications subsystem 200 may also include base station 105-a, which may be an example of a base station 105 described above with reference to FIG. 1. Base station 105-a may transmit control and data to any UE 115 within its geographic coverage area 110-a via a communication link 125-a. For example, communication link 125-a may allow for bidirectional communication between a UE 115-a and a base station 105-a.

Wireless communications subsystem 200, as mentioned above, may provide UE 115-a access to the network that may be initiated through a random access request on the PRACH, such as when UE 115-a is transitioning from RRC idle mode to RRC connected mode. The random access request may include a sequence of data bits in a PRACH preamble, which may be a Zadoff-Chu (ZC) sequence, according to established PRACH procedures. The PRACH preamble may be determined based on a root ZC sequence, according to established procedures. Wireless communications subsystem 200 may include UEs 115 with different capabilities and different communication environments. For example, UE 115-a may be located relatively close to base station 105-a and may have different radio capacity than other devices, and may therefore use a coverage enhancement level which differs from a coverage enhancement level that would be needed if UE 115-a were located relatively far from base station 105-a, for example.

In some examples, UE 115-a may transmit an initial random access request, including a PRACH preamble, at an initial random access transmit power. The initial random access transmit power may be determined, in some examples, based on a set of available initial random access transmit powers and a RSRP measurement made by UE 115-a. The base station 105-a may, in some examples, signal to the UE 115-a information related to random access attempts, which may include information on how to set a transmission power level for an initial random access attempt. In some examples, base station 105-a may signal information to the UE 115-a, prior to an RSRP measurement, a set of possible initial power levels. Such a set of possible initial power levels may be a subset of a total number of available power levels. For example, the total number of available power levels may be 0 dBm, 5 dBm, 10 dBm, and 15 dBm, and the signaled set of possible initial power levels may include possible initial power levels of 0 dBm, 5 dBm, and 15 dBm. The UE 115-a may perform an RSRP measurement, and based on the value of the RSRP measurement it may select one of the initial power levels for an initial random access request message.

In certain examples, the base station 105-a may, additionally or alternatively, signal a set of thresholds associated with RSRP measurements. The number of thresholds may, in some examples, correspond with the set of possible initial power levels. For example, a threshold may indicate that, if an RSRP measurement is above or below the threshold, a particular initial transmission power is to be used for a random access attempt. One or more of the thresholds may correspond with one or more of the transmission powers in the set of transmission powers, or may be located at some point between transmission powers, such as a middle point between two adjacent power levels, for example. A specific threshold may be tied to the RSRP PDF at the corresponding power level, and thereby provide a transmission power that corresponds to the measured RSRP. Continuing with the example as discussed above, in which the set of possible initial power levels includes three possible initial power levels (0, 5, 15 dBm), two RSRP thresholds may be set at −2.5 dB and at −7.5 dB, such that an initial transmit power of 0 dBm may be used for RSRP values greater than −2.5 dB, an initial transmit power of 5 dBm may be used for RSRP values at or between −2.5 dB and −7.5 dB, and an initial transmit power of 15 dBm may be used for RSRP values less than −7.5 dB. Thus, the selected initial transmission power level may be inversely proportional to the RSRP measurement.

The UE 115-a may, for example, receive the signaling indicating the set of initial transmit powers, or signaling indicating RSRP threshold values, or both. In some examples, a single transmission, such as a MAC or RLC layer data packet, may include both initial transmit power values and RSRP threshold values. In some examples, the set of RSRP threshold values may be uniquely mapped to the set of initial transmission power levels, and thus the signaling of the RSRP threshold values may serve to provide the set of initial transmit powers. In certain examples, the set of RSRP threshold values may include a number of elements that is equal to a number of elements in the set of initial transmission power levels minus one. After receipt of such signaling, the UE 115-*a* may determine that a random access attempt is to be completed, and perform an RSRP measurement. After performance of the RSRP measurement, the UE 115-*a* may compare the result with the threshold, and select an initial power level for an initial random access transmission based on the set of possible initial power levels, the threshold values, and the RSRP measurement. In some examples, once the initial power level is determined, a second power level for a second random access attempt after a RACH failure may be determined. For example, if an initial power level is 0 dBm, the ensuing power levels after failed attempts may increase to 5 dBm, 10 dBm, and 15 dBm, for successive random access attempts. Likewise, if an initial power level is 5 dBm, the ensuing power levels after failed attempts may be 10 dBm and 15 dBm, respectively.

Following a successful random access procedure, in some examples, adjustments may be made to the set of possible initial power levels. For example, following a successful random access procedure, it may be determined that the UE 115-*a* used a first transmission power for the successful random access message, and the base station 105-*a* may signal a subsequent set of possible initial power levels that the UE 115-*a* is to use for subsequent random access attempts. Such techniques may provide for more efficient network access by reducing a number random access attempts needed to gain network access. For example, for a subsequent random access attempt by the UE 115-*a* following wake up from idle mode and transitioning to a connected mode, the subsequent set of possible initial power levels may be used for determining an initial transmission power. Continuing with the example above, if the UE 115-*a* had an initial set of possible initial power levels and gained network access with an initial transmit power of 0 dBm, the base station 105-*a* may provide a subsequent set of possible initial power levels for later access attempts by the UE 115-*a* which may be adjusted to, for example, initial power levels of 0 dBm, 5 dBm, and 10 dBm, with RSRP threshold values of −2.5 and −7.5 dB. In other examples, if UE 115-*a* initially gained access to the network with a transmission power of 15 dBm, the base station 105-*a* may provide a subsequent set of possible initial power levels for later access attempts by the UE 115-*a* which may be adjusted to, for example, initial power levels of 5 dBm and 15 dBm, with an RSRP threshold value of −7.5 dB. Of course, these two examples are provided for illustration and discussion only, and one of skill in the art will readily recognize that other sets of initial power levels and threshold values may be used.

Figure 3:
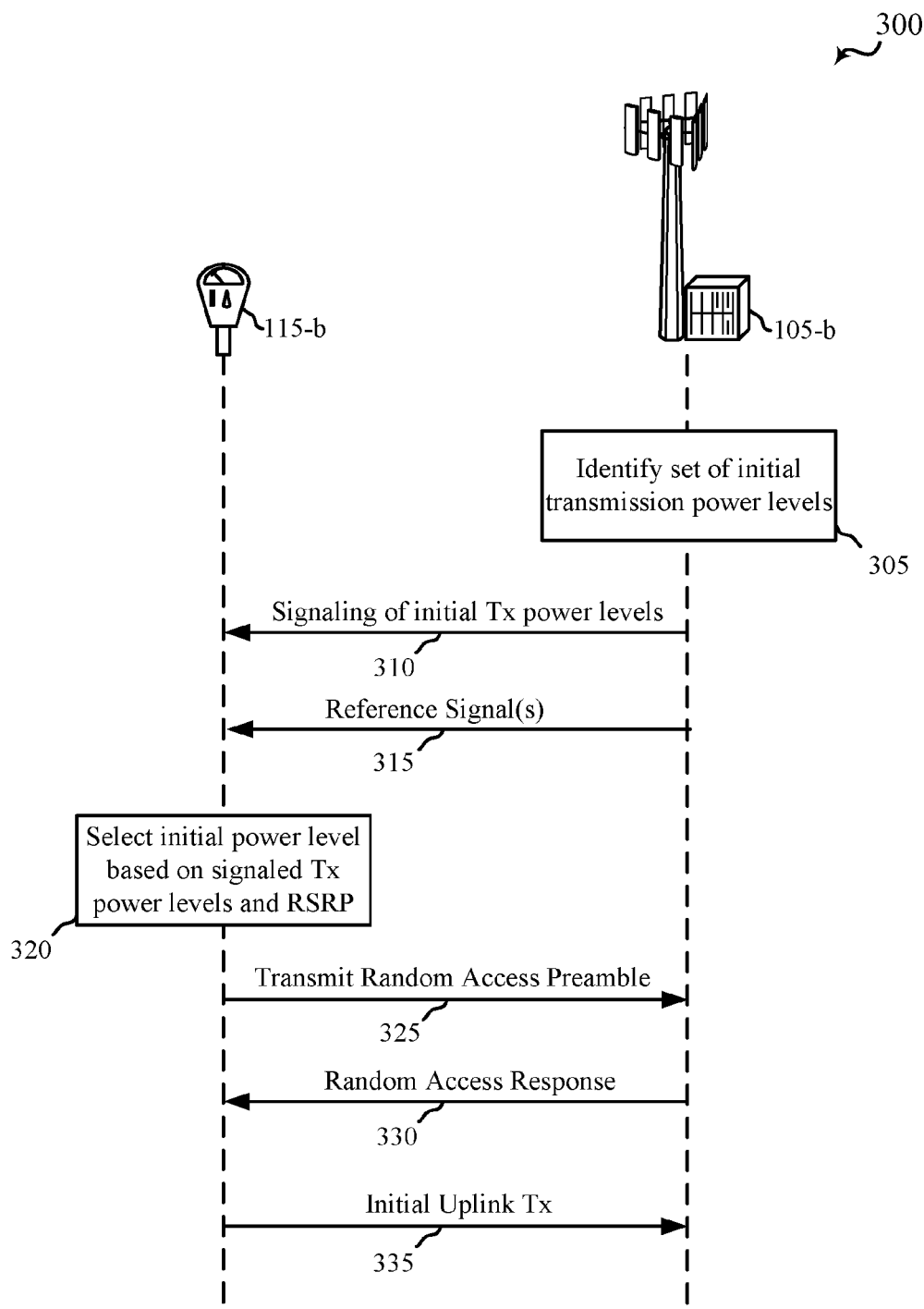
FIG. 3 illustrates an example of a call flow diagram depicting communication within a wireless communications system in accordance with various aspects of the present disclosure.

FIG. 3 is a call flow diagram 300 depicting communication within a wireless communications system according to various aspects. The diagram 300 may illustrate random access initial power level techniques employed within the systems 100 or 200 of FIG. 1 or 2. The diagram 300 includes a UE 115-*b* and a base station 105-*b*, which may be examples of a UE 115 and base station 105 of FIG. 1 or 2. The UE 115-*b* may be an MTC device; and the UE 115-*b* and the base station 105-*b* may be employing coverage enhancement techniques. The diagram 300 may be an example of random access procedures, such as a situation in which the UE 115-*b* is transitioning from RRC idle mode to RRC connected mode.

The base station 105-*b* may identify a set of initial transmission power levels, as indicated at block 305. The base station 105-*b* may signal the initial transmission power levels to UE 115-*b* in downlink transmission 310, which may be, for example, included in a control transmission from the base station 105-*b*. The set of initial transmission power levels may be determined, for example, based on probability density functions associated with RSRP measurements of UE 115-*b*. The base station 105-*b* may transmit one or more reference signal(s) 315, which may be received at UE 115-*b* and used to make an RSRP measurement. At block 320, the UE 115-*b* may select an initial power level for a random access message based on the signaled available transmission power levels and the RSRP. For example, the UE 115-*b* may measure RSRP from the base station 105-*b*, and an initial transmit power for PRACH transmissions may be determined based on the RSRP and available transmission powers such as discussed above.

UE 115-*b* may transmit an initial random access preamble 325 at the selected initial random access transmit power. In the event that the transmitted random access preamble 325 is received at base station 105-*b*, a random access response 330 is transmitted to the UE 115-*b*. Following the random access response 330, the UE 115-*b* may transmit an initial uplink transmission 335 and transition to an RRC connected state.

Figure 4:
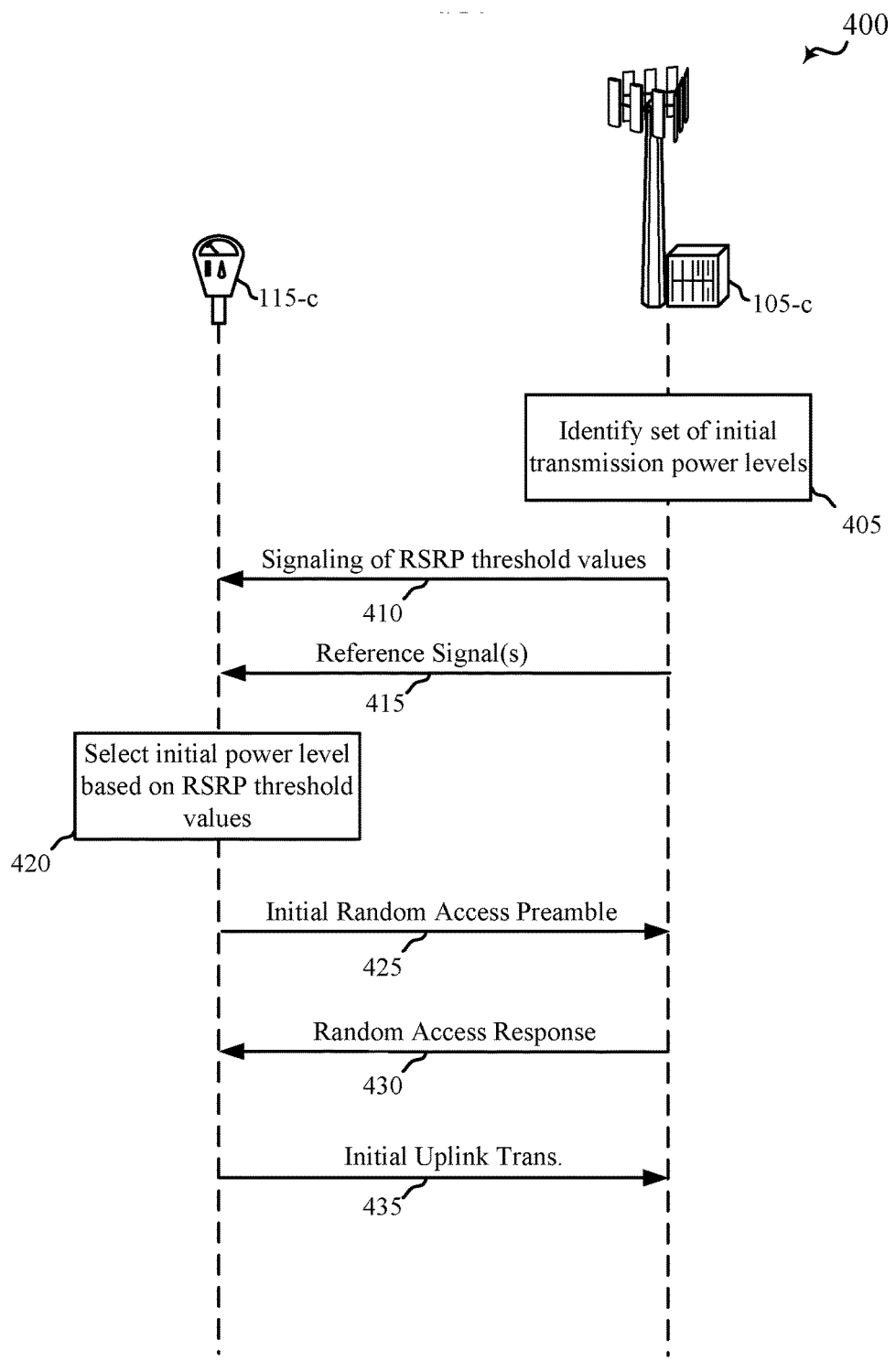
FIG. 4 illustrates an example of another call flow diagram depicting communication within a wireless communications system in accordance with various aspects of the present disclosure.

As mentioned above, in some examples one or more threshold values may be provided to a UE for use in determining an initial random access transmission power. FIG. 4 is a call flow diagram 400 depicting communication based on such threshold value(s) within a wireless communications system according to various aspects of the disclosure. The diagram 400 may illustrate initial random access techniques employed within the systems 100 or 200 of FIG. 1 or 2. The diagram 400 includes a UE 115-*c* and a base station 105-*c*, which may be examples of a UE 115 and base station 105 of FIG. 1 or 2. The UE 115-*c* may be an MTC device; and the UE 115-*c* and the base station 105-*c* may be employing coverage enhancement techniques. The diagram 400 may be an example of random access procedures, such as a situation in which the UE 115-*c* is transitioning from RRC idle mode to RRC connected mode.

The base station 105-*c* may identify a set of initial transmission power levels, similarly as discussed above, and as indicated at block 405. The base station 105-*c* may signal one or more RSRP threshold values to UE 115-*c* in downlink transmission 410, which may be, for example, included in a control transmission from the base station 105-*c*. The set of initial transmission power levels may be determined, for example, based on probability density functions associated with RSRP measurements of UE 115-*c* and may be signaled separately from threshold value transmission 410, or with threshold value transmission 410. In certain examples, the set of initial transmission power levels may be mapped to signaled RSRP threshold values or may be established according to a network configuration or standard. The base station 105-*c* may transmit one or more reference signal(s) 415, which may be received at UE 115-*c* and used to make an RSRP measurement. At block 420, the UE 115-*c* may select an initial power level for a random access message based on the RSRP threshold value(s). For example, the UE 115-*c* may measure RSRP from the base station 105-*c*, and an initial transmit power for PRACH transmissions may be determined based on the RSRP, RSRP threshold value(s), and available transmission powers such as discussed above.

UE 115-*c* may transmit an initial random access preamble 425 at the selected initial random access transmit power. In the event that the transmitted random access preamble 425 is received at base station 105-*c*, a random access response 430 is transmitted to the UE 115-*c*. Following the random access response 430, the UE 115-*c* may transmit an initial uplink transmission 435 and transition to an RRC connected state.

Figure 5:
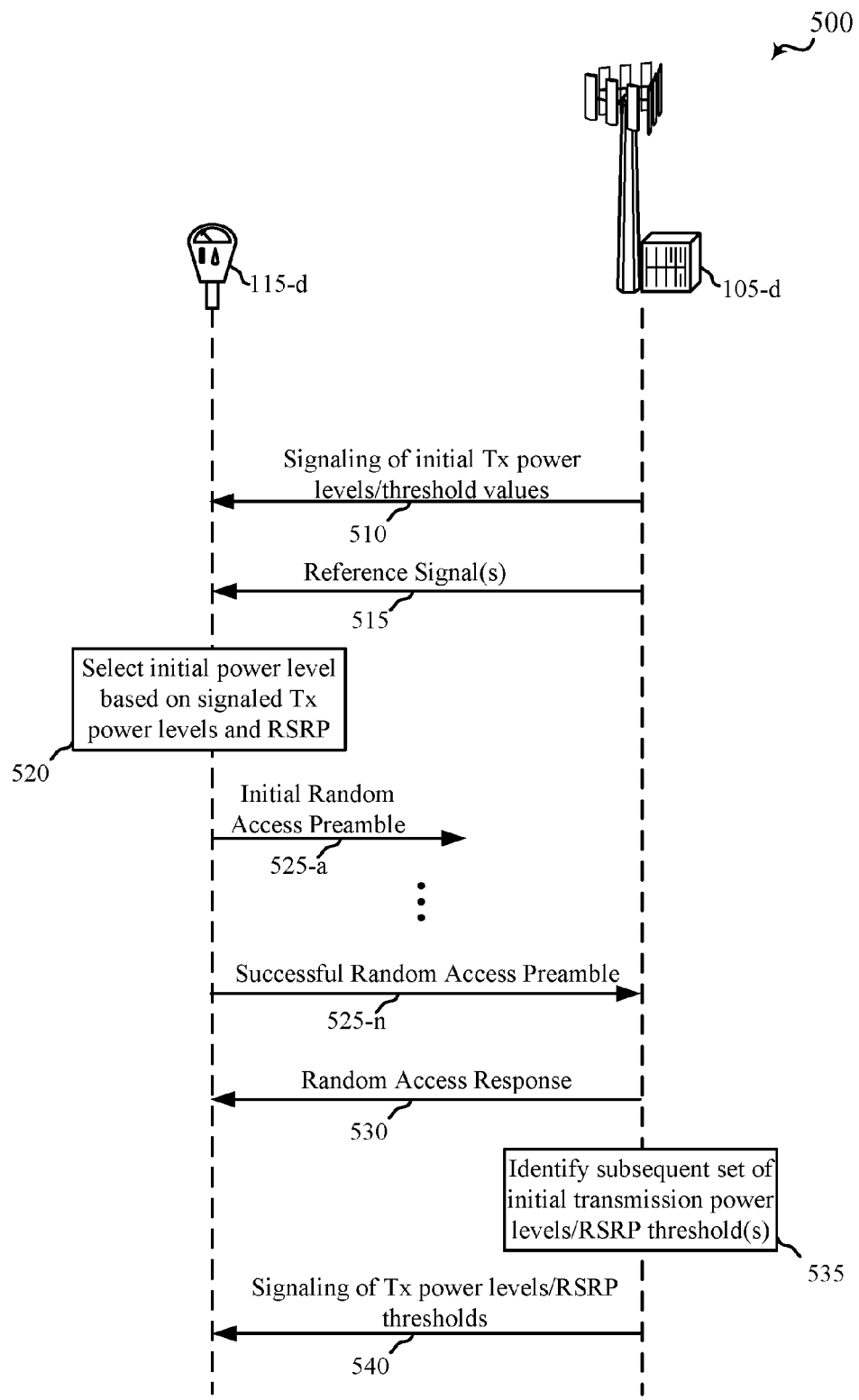
FIG. 5 illustrates an example of another call flow diagram depicting communication within a wireless communications system in accordance with various aspects of the present disclosure.

As mentioned above, in some examples a set of initial transmission powers may be adaptively established based on prior successful random access attempts. FIG. 5 is a call flow diagram 500 depicting communication within a wireless communications system that may provide adaptive initial random access transmission powers, according to various aspects of the disclosure. The diagram 500 may illustrate initial random access techniques employed within the systems 100 or 200 of FIG. 1 or 2. The diagram 500 includes a UE 115-*d* and a base station 105-*d*, which may be examples of a UE 115 and base station 105 of FIG. 1 or 2. The UE 115-*d* may be an MTC device; and the UE 115-*d* and the base station 105-*d* may be employing coverage enhancement techniques. The diagram 500 may be an example of random access procedures, such as a situation in which the UE 115-*d* is transitioning from RRC idle mode to RRC connected mode.

The base station 105-*d* may identify a set of initial transmission power levels and/or threshold values, similarly as discussed above. The base station 105-*d* may signal a set of initial transmission powers and/or one or more RSRP threshold values to UE 115-*d* in downlink transmission 510 which may be, for example, included in a control transmission from the base station 105-*d*. The set of initial transmission power levels and RSRP threshold values may be determined, as discussed above, based on probability density functions associated with RSRP measurements of UE 115-*d*. The base station 105-*d* may transmit one or more reference signal(s) 515, which may be received at UE 115-*d* and used to make an RSRP measurement. At block 520, the UE 115-*d* may select an initial power level for a random access message based on the set of initial power levels and the RSRP threshold value(s), similarly as discussed above. For example, the UE 115-*d* may measure RSRP from the base station 105-*d*, and an initial transmit power for PRACH transmissions may be determined based on the RSRP, RSRP threshold value(s), and available transmission powers such as discussed above.

UE 115-*d* may transmit an initial random access preamble 525-*a* at the selected initial random access transmit power. In this example, initial random access attempt 525-*a* fails, and is followed by one or more subsequent random access attempts until a successful attempt transmitting random access preamble 525-*n* is achieved. A random access response 530 is transmitted to the UE 115-*d* following successful random access attempt 525-*n*. The base station 105-*d* may identify a subsequent set of initial transmission power levels and/or RSRP threshold value(s), as indicated at block 535, in a manner similar as discussed above, to provide an adaptive set of transmission power levels/RSRP thresholds. The base station 105-*d* may transmit signaling of the transmit power levels and/or RSRP thresholds at transmission 540. The UE 115-*d*, when performing a subsequent random access procedure, may use such subsequent transmission powers and RSRP thresholds for initial random access attempts of the subsequent random access procedures.

Figure 6:
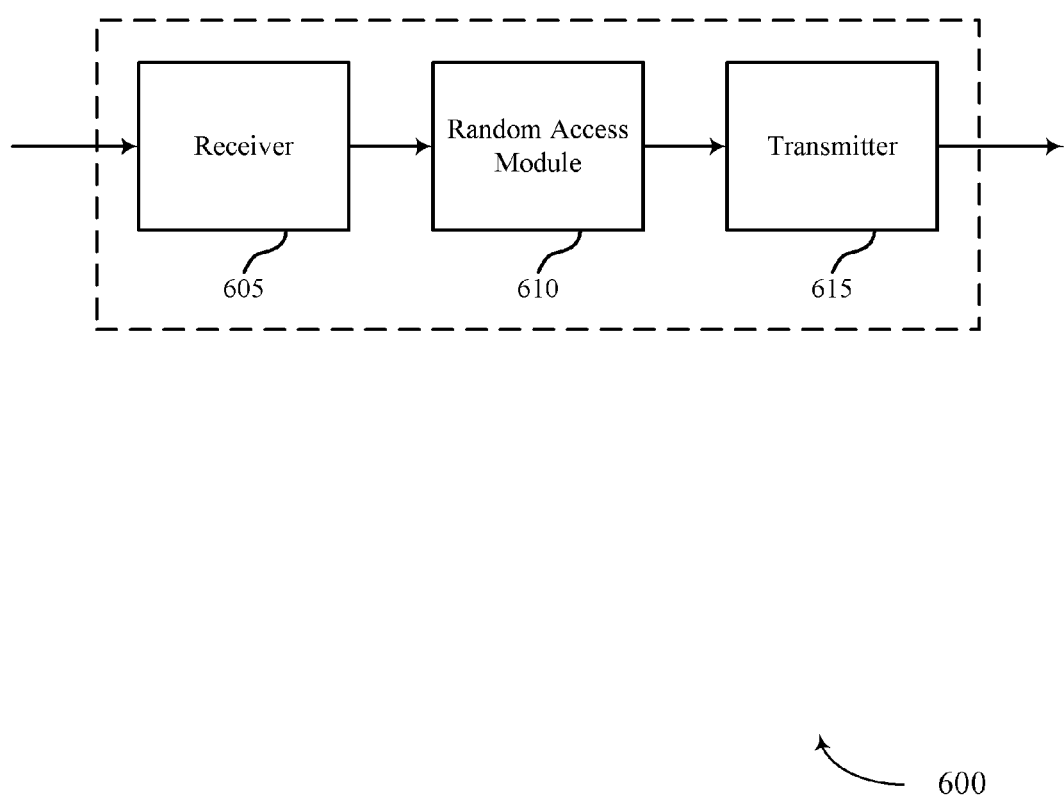
FIG. 6 shows a block diagram of a device configured for random access power level selection in accordance with various aspects of the present disclosure.

FIG. 6 shows a block diagram of a wireless device 600 configured for random access power level selection in accordance with various aspects of the present disclosure. Wireless device 600 may be an example of aspects of a UE 115 or a base station 105 described with reference to FIGS. 1-5. Wireless device 600 may include a receiver 605, a random access module 610, or a transmitter 615. Wireless device 600 may also include a processor. Each of these components may be in communication with each other.

The components of wireless device 600 may, individually or collectively, be implemented with at least one application specific integrated circuit (ASIC) adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

The receiver 605 may receive information such as packets, user data, or control information associated with various information channels (e.g., control channels, data channels, and information related to a set of available transmission powers and/or RSRP threshold values for MTC devices, etc.). Information may be passed on to the random access module 610, and to other components of wireless device 600. In some examples, the receiver 605 may receive redundant transmissions from a transmitter using the one or more resources (e.g., a UE 115 may receive time domain bundled downlink transmissions or a base station 105 may receive time domain bundled uplink transmissions). In some examples, the receiver 605 may receive a set of initial random access power levels and/or RSRP threshold values, such as discussed above. In other examples, the receiver 605 may receive a random access request message.

The random access module 610 may identify available initial random access power levels and one or more RSRP threshold values that may be used in determining a power level for an initial random access message transmission. The transmitter 615 may transmit signals received from other components of wireless device 600. In some examples, the transmitter 615 may be collocated with the receiver 605 in a transceiver module. The transmitter 615 may include a single antenna, or it may include a plurality of antennas. In some examples, the transmitter 615 may transmit random access messages or information related to available initial random access power levels and RSRP threshold values.

Figure 7:
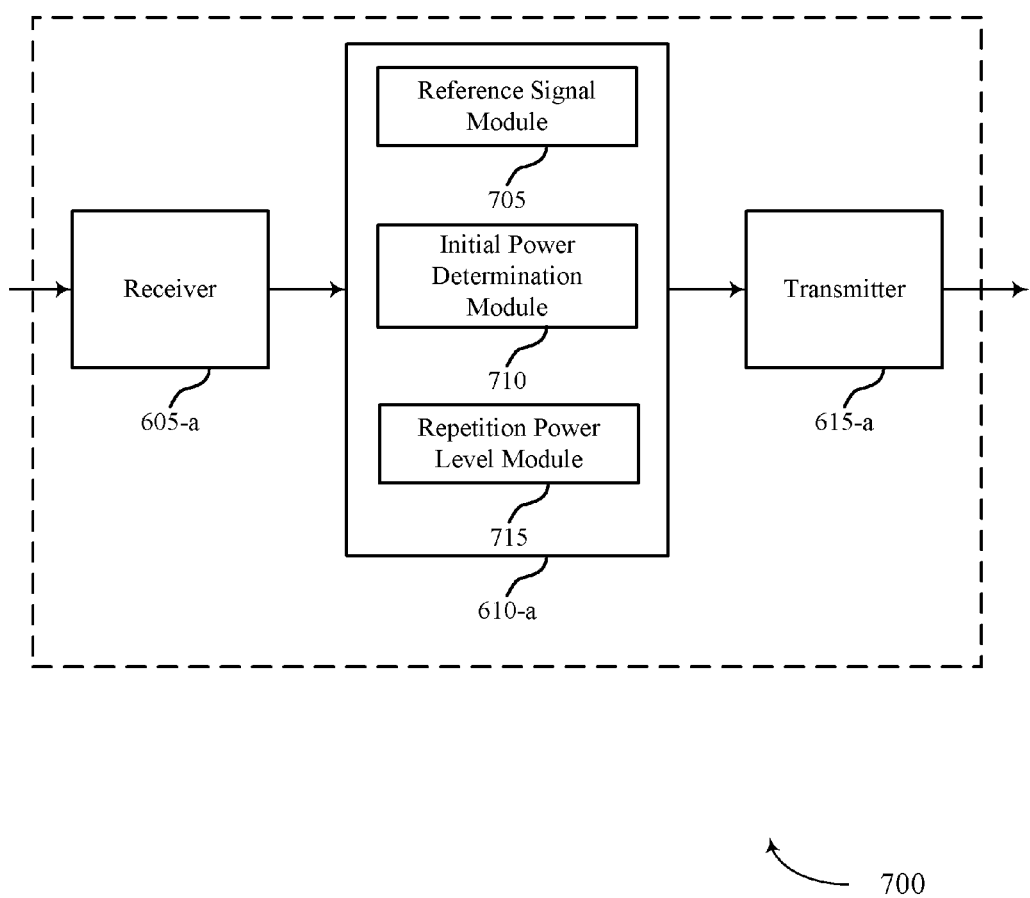
FIG. 7 shows a block diagram of another device configured for random access request power level selection in accordance with various aspects of the present disclosure.

FIG. 7 shows a block diagram of a wireless device 700 configured for random access power level selection in accordance with various aspects of the present disclosure. Wireless device 700 may be an example of aspects of a wireless device 600 described with reference to FIGS. 1-6 (e.g., it may represent a UE 115 or a base station 105). Wireless device 700 may include a receiver 605-*a*, a random access module 610-*a*, or a transmitter 615-*a*. Wireless device 700 may also include a processor. Each of these components may be in communication with each other. The random access module 610-*a* may also include a reference signal module 705, an initial power determination module 710, and repetition power level module 715.

The components of wireless device 700 may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The receiver 605-*a* may receive information which may be passed on to random access module 610-*a*, and to other components of wireless device 700. The random access module 610-*a* may perform the operations described above with reference to FIG. 6. The transmitter 615-*a* may transmit signals received from other components of wireless device 700.

The reference signal module 705 may perform RSRP measurements on an received reference signal, or may provide a reference signal for transmission, as described above with reference to FIGS. 1-5. The initial power determination module 710 may be configured to determine an initial random access transmission power based, wholly or partially, on a RSRP value, as described above with reference to FIGS. 1-5. For example, the initial power determination module 710 may be configured to determine an initial random access transmission power based on a RSRP value provided by the reference signal module 705. In examples where wireless device 700 may represent a base station, the initial power determination module 710 may determine a set of available initial transmission powers based on, for example, a PDF of RSRPs, and may additionally or alternatively provide one or more RSRP threshold values, as described above with reference to FIGS. 1-5. And the transmitter module 615-*a* may transmit uplink channels according to the determined transmission power. The repetition power level module 715 may be configured to determine a power level for repeated random access request transmissions, as described above with reference to FIGS. 1-5.

Figure 8:
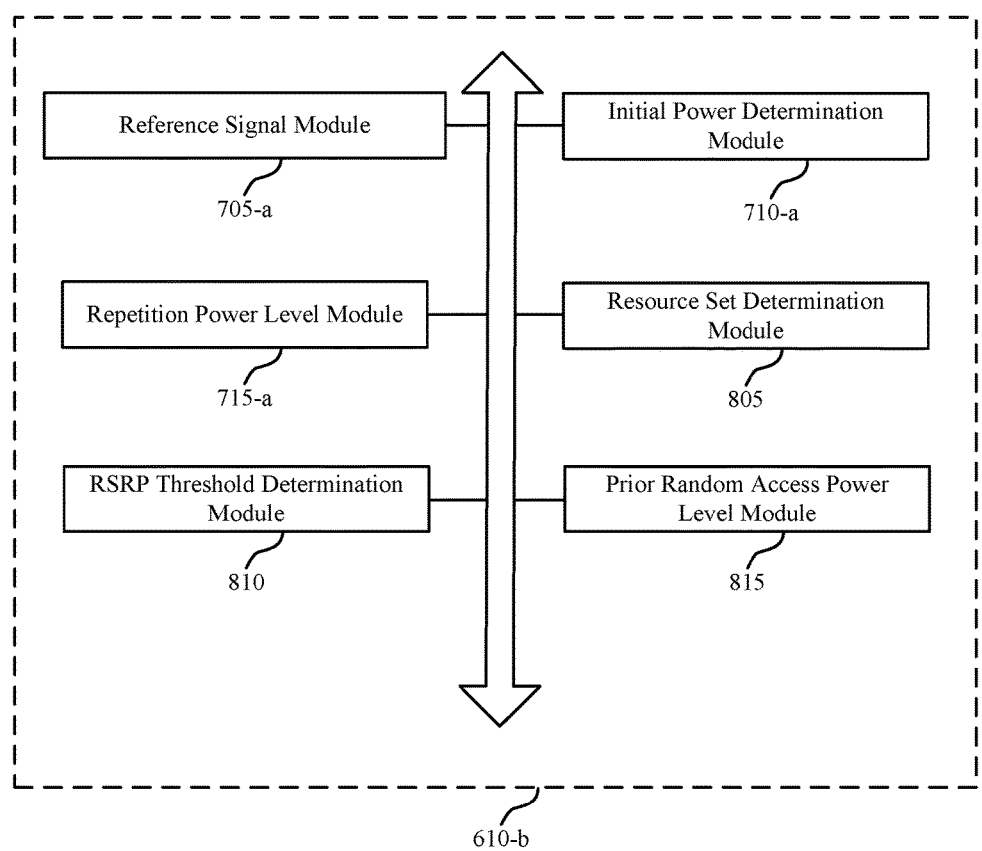
FIG. 8 shows a block diagram of a random access module for a device in accordance with various aspects of the present disclosure.

FIG. 8 shows a block diagram of a random access module 610-*b* for random access power level selection in accordance with various aspects of the present disclosure. The random access module 610-*b* may be an example of aspects of a random access module 610 described with reference to FIGS. 6-7. The random access module 610-*b* may include a reference signal module 705-*a*, an initial power determination module 710-*a*, and a repetition power level module 715-*a*. Each of these modules may perform the functions described above with reference to FIG. 7. The random access module 610-*b* may also include a resource set determination module 805, a RSRP threshold determination module 810, and a prior random access power level module 815.

The components of the random access module 610-*b* may, individually or collectively, be implemented with at least one ASIC adapted to perform some or all of the applicable functions in hardware. Alternatively, the functions may be performed by one or more other processing units (or cores), on at least one IC. In other embodiments, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The resource set determination module 805 may be configured to determine resource sets for random access requests, including power resources and bundling resources, as described above with reference to FIGS. 1-5, and also may determine power and/or repetition resources for repeated random access transmissions. The RSRP threshold determination module 810 may be configured to determine RSRP threshold values, as described above with reference to FIGS. 1-5. Prior random access power level module 815 may determine a power level for a prior successful random access transmission, and may provide such information to one or more other modules of random access module 610-*b* for use in providing transmission power levels and RSRP threshold values for subsequent random access transmissions of a UE, as described above with reference to FIGS. 1-5.

Figure 9:
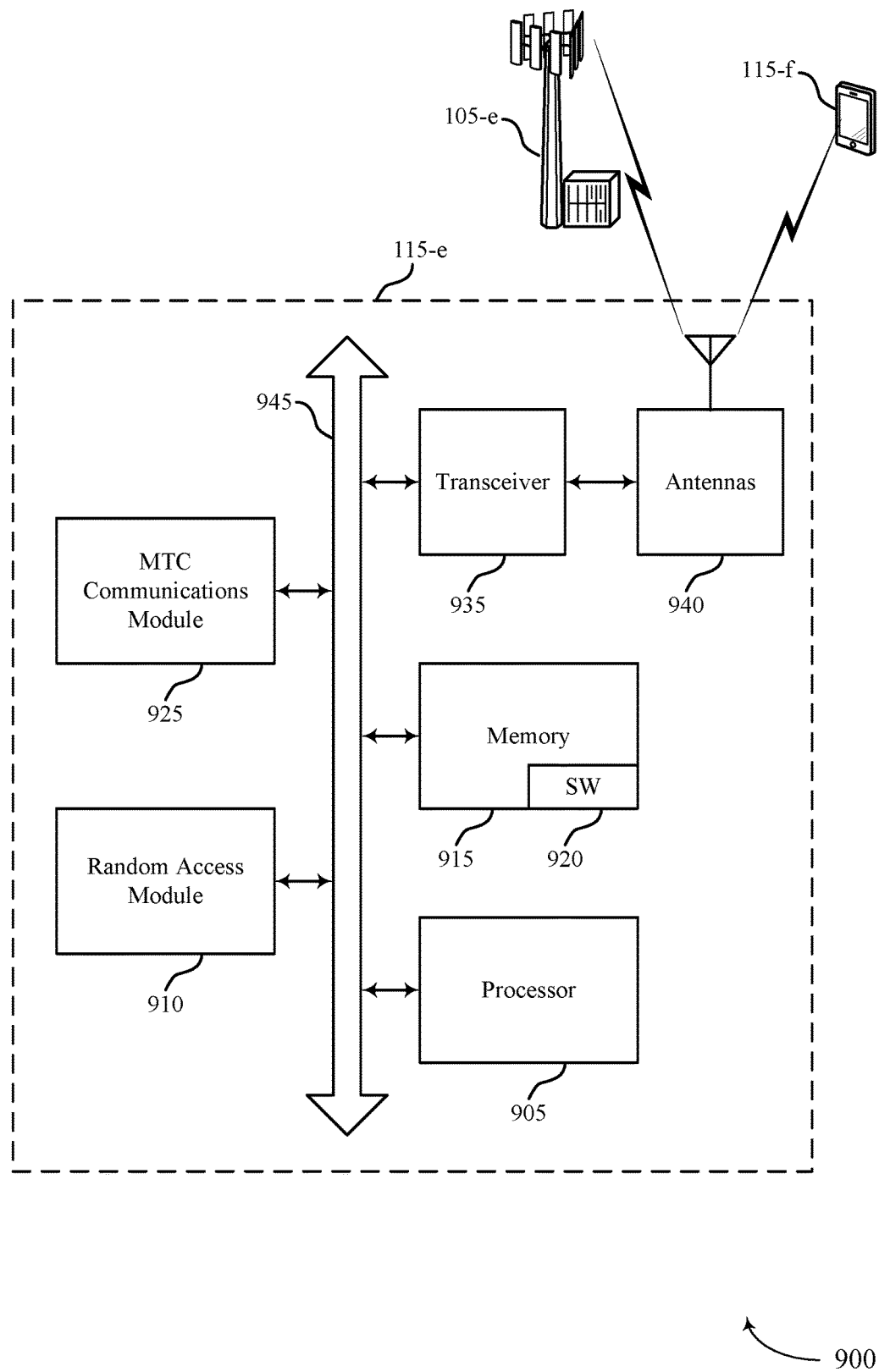
FIG. 9 illustrates a block diagram of a system including a UE configured for random access request power level selection in accordance with various aspects of the present disclosure.

FIG. 9 shows a diagram of a system 900 including a UE 115 configured for random access power level selection in accordance with various aspects of the present disclosure. System 900 may include UE 115-*e*, which may be an example of a UE 115, a wireless device 600, or a wireless device 700 described above with reference to FIGS. 1-8. UE 115-*e* may include a random access module 910, which may be an example of a random access module 610 described with reference to FIGS. 6-8. UE 115-*e* may also include a MTC communications module 925, that may perform operations related to MTC communications described above with reference to FIGS. 1-5. UE 115-*e* may also include components for bi-directional voice and data communications including components for transmitting communications and components for receiving communications. For example, UE 115-*e* may communicate bi-directionally with UE 115-*f* or base station 105-*e*.

The random access module 910 may be configured to perform random access procedures based at least in part on available initial transmission powers and/or RSRP threshold values as described above with reference to FIGS. 1-8. In some examples, the device may be an MTC device.

UE 115-*e* may also include a processor module 905, and memory 915 (including software (SW)) 920, a transceiver 935, and one or more antenna(s) 940, each of which may communicate, directly or indirectly, with one another (e.g., via buses 945). The transceiver 935 may communicate bi-directionally, via the antenna(s) 940 or wired or wireless links, with one or more networks, as described above. For example, the transceiver 935 may communicate bi-directionally with a base station 105 or another UE 115. The transceiver 935 may include a modem to modulate the packets and provide the modulated packets to the antenna(s) 940 for transmission, and to demodulate packets received from the antenna(s) 940. While UE 115-*e* may include a single antenna 940, UE 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor module 905 to perform various functions described herein (e.g., random access power level selection for MTC devices, etc.). Alternatively, the software/firmware code 920 may not be directly executable by the processor module 905 but cause a computer (e.g., when compiled and executed) to perform functions described herein. The processor module 905 may include an intelligent hardware device, (e.g., a central processing unit (CPU), a microcontroller, an ASIC, etc.).

Figure 10:
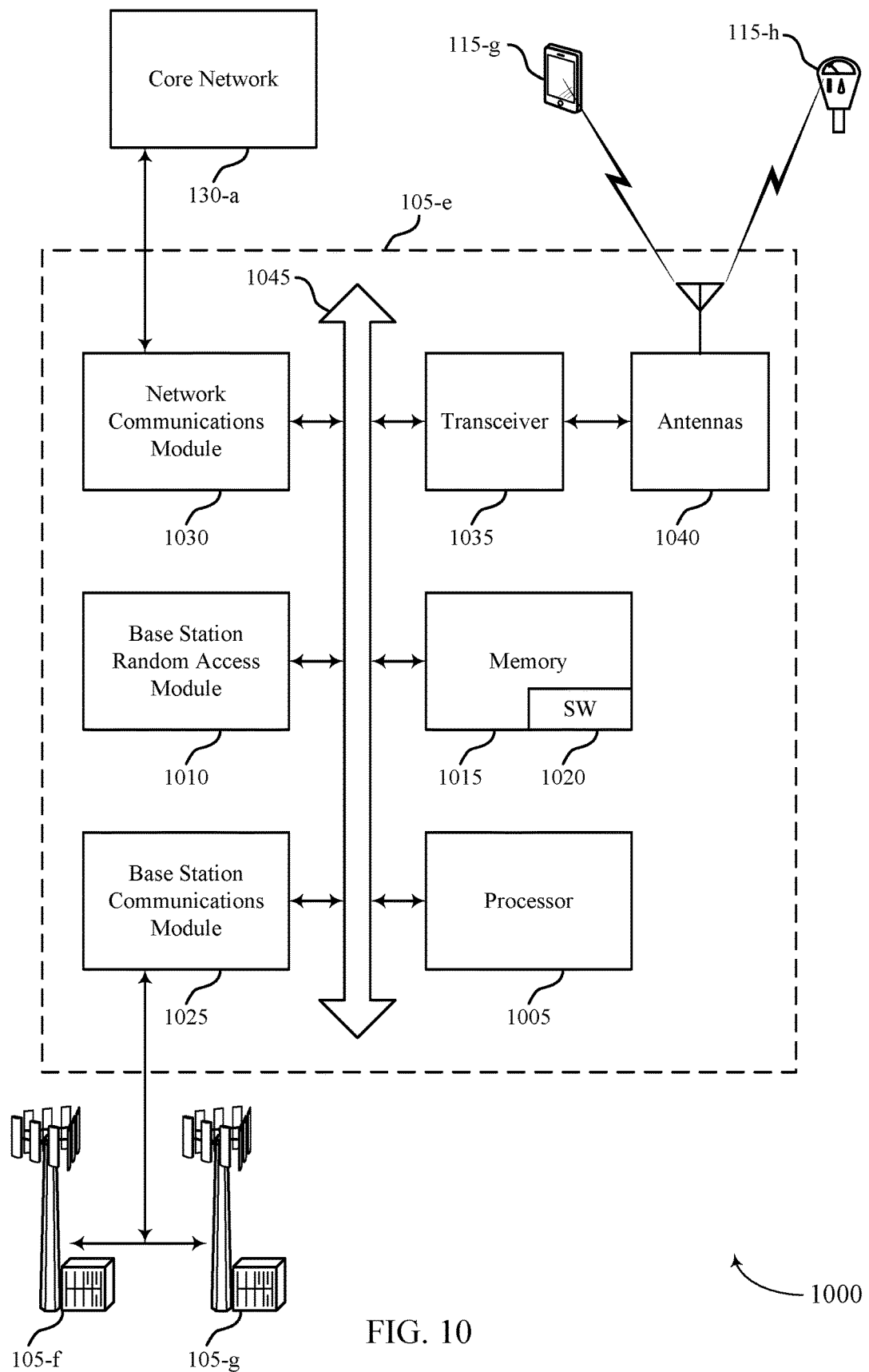
FIG. 10 illustrates a block diagram of a system including a base station configured for random access request power level selection in accordance with various aspects of the present disclosure.

FIG. 10 shows a diagram of a system 1000 including a base station 105-*e* configured random access power level selection in accordance with various aspects of the present disclosure. System 1000 may include base station 105-*e*, which may be an example of a base station 105, a wireless device 700 or 800 described above with reference to FIGS. 1-9. Base station 105-*e* may include a base station random access module 1010, which may be an example of a random access module 610 described with reference to FIGS. 6-8. Base station 105-*e* may also include components for bi-directional voice and data communications including components for transmitting communications and components for receiving communications. For example, base station 105-*e* may communicate bi-directionally with UE 115-*g* or UE 115-*h*, which may be MTC devices.

In some cases, base station 105-*e* may have one or more wired backhaul links. Base station 105-*e* may have a wired backhaul link (e.g., S1 interface, etc.) to the core network 130. Base station 105-*e* may also communicate with other base stations 105, such as base station 105-*f* and base station 105-*g* via inter-base station backhaul links (e.g., an X2 interface). Each of the base stations 105 may communicate with UEs 115 using the same or different wireless communications technologies. In some cases, base station 105-*e* may communicate with other base stations such as 105-*f* or 105-*g* utilizing base station communication module 1025. In some examples, base station communication module 1025 may provide an X2 interface within an LTE/LTE-A wireless communication network technology to provide communication between some of the base stations 105. In some examples, base station 105-*e* may communicate with other base stations through core network 130. In some cases, base station 105-*e* may communicate with the core network 130 through network communications module 1030.

The base station 105-*e* may include a processor 1005, memory 1015 (including software (SW) 1020), transceiver 1035, and antenna(s) 1040, which each may be in communication, directly or indirectly, with one another (e.g., over bus system 1045). The transceiver 1035 may be configured to communicate bi-directionally, via the antenna(s) 1040, with the UEs 115, which may be multi-mode devices. The transceiver 1035 (or other components of the base station 105-*d*) may also be configured to communicate bi-directionally, via the antennas 1040, with one or more other base stations (not shown). The transceiver 1035 may include a modem configured to modulate the packets and provide the modulated packets to the antennas 1040 for transmission, and to demodulate packets received from the antennas 1040. The base station 105-*e* may include multiple transceiver modules 1035, each with one or more associated antennas 1040. The transceiver module may be an example of a combined receiver 605 and transmitter 615 of FIG. 6.

The memory 1015 may include RAM and ROM. The memory 1015 may also store computer-readable, computer-executable software code 1020 containing instructions that are configured to, when executed, cause the processor 1005 to perform various functions described herein (e.g., random access power level selection for MTC devices, etc.). Alternatively, the software code 1020 may not be directly executable by the processor 1005 but be configured to cause the computer, e.g., when compiled and executed, to perform functions described herein. The processor 1005 may include an intelligent hardware device, e.g., a CPU, a microcontroller, an ASIC, etc. The processor 1005 may include various special purpose processors such as encoders, queue processing modules, base band processors, radio head controllers, digital signal processor (DSPs), and the like. The base station communication module 1025 may manage communications with other base stations 105. The communications management module may include a controller or scheduler for controlling communications with UEs 115 in cooperation with other base stations 105.

Figure 11:
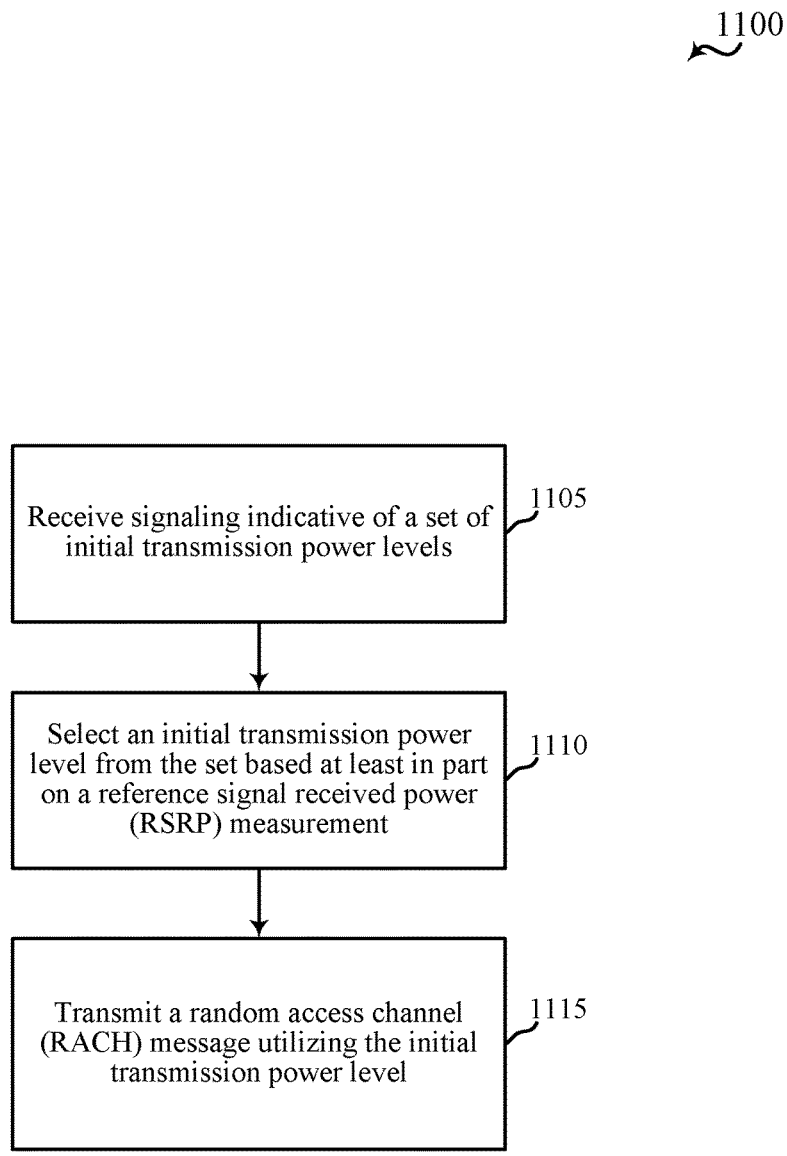
FIG. 11 shows a flowchart illustrating a method for communication with random access power level selection in accordance with various aspects of the present disclosure.

FIG. 11 shows a flowchart illustrating a method 1100 for wireless communication in accordance with various aspects of the present disclosure. The operations of method 1100 may be implemented by a wireless device (e.g., a UE 115, a wireless device 600 or a wireless device 700) or its components as described with reference to FIGS. 1-9. For example, the operations of method 1100 may be performed by the random access module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1105, the method may include receiving signaling indicative of a set of initial transmission power levels, as described above with reference to FIGS. 1-5. In certain examples, the operations of block 1105 may be performed by the receiver module 605 as described above with reference to FIG. 6-8, or antennas 940 and transceiver 935 as described above with reference to FIG. 9.

At block 1110, the method may include selecting an initial transmission power level from the set based at least in part on a reference signal received power (RSRP) measurement, as described above with reference to FIGS. 1-5. In certain examples, the operations of block 1110 may be performed by the initial power determination module 710 as described above with reference to FIG. 7-8, or random access module 910 as described above with reference to FIG. 9.

At block 1115, the method may include transmitting a random access channel (RACH) message utilizing the initial transmission power level, as described above with reference to FIGS. 1-5. In certain examples, the operations of block 1115 may be performed by the transmitter module 615 as described above with reference to FIG. 6-8, or antennas 940 and transceiver 935 as described above with reference to FIG. 9.

Figure 12:
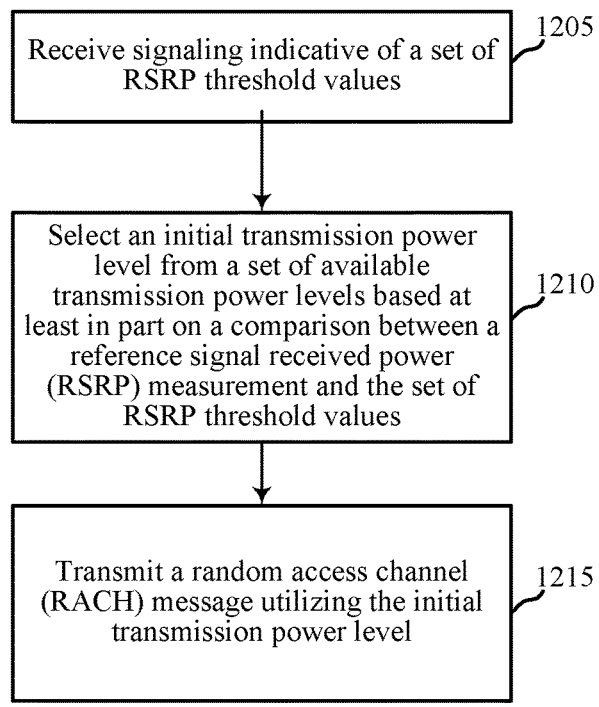
FIG. 12 shows a flowchart illustrating a method for communication with random access power level selection in accordance with various aspects of the present disclosure.

FIG. 12 shows a flowchart illustrating a method 1200 for wireless communication in accordance with various aspects of the present disclosure. The operations of method 1200 may be implemented by a wireless device (e.g., a UE 115, a wireless device 600 or a wireless device 700) or its components as described with reference to FIGS. 1-9. For example, the operations of method 1200 may be performed by the random access module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1205, the method may include receiving signaling indicative of a set of RSRP threshold values, as described above with reference to FIGS. 1-5. In certain examples, the operations of block 1205 may be performed by the receiver module 605 as described above with reference to FIG. 6-8, or antennas 940 and transceiver 935 as described above with reference to FIG. 9.

At block 1210, the method may include selecting an initial transmission power level from a set of available transmission power levels based at least in part on a comparison between a reference signal received power (RSRP) measurement and the set of RSRP threshold values, as described above with reference to FIGS. 1-5. In certain examples, the operations of block 1210 may be performed by the initial power determination module 710 as described above with reference to FIG. 7-8, or random access module 910 as described above with reference to FIG. 9.

At block 1215, the method may include transmitting a random access channel (RACH) message utilizing the initial transmission power level, as described above with reference to FIGS. 1-5. In certain examples, the operations of block 1215 may be performed by the transmitter module 615 as described above with reference to FIG. 6-8, or antennas 940 and transceiver 935 as described above with reference to FIG. 9.

Figure 13:
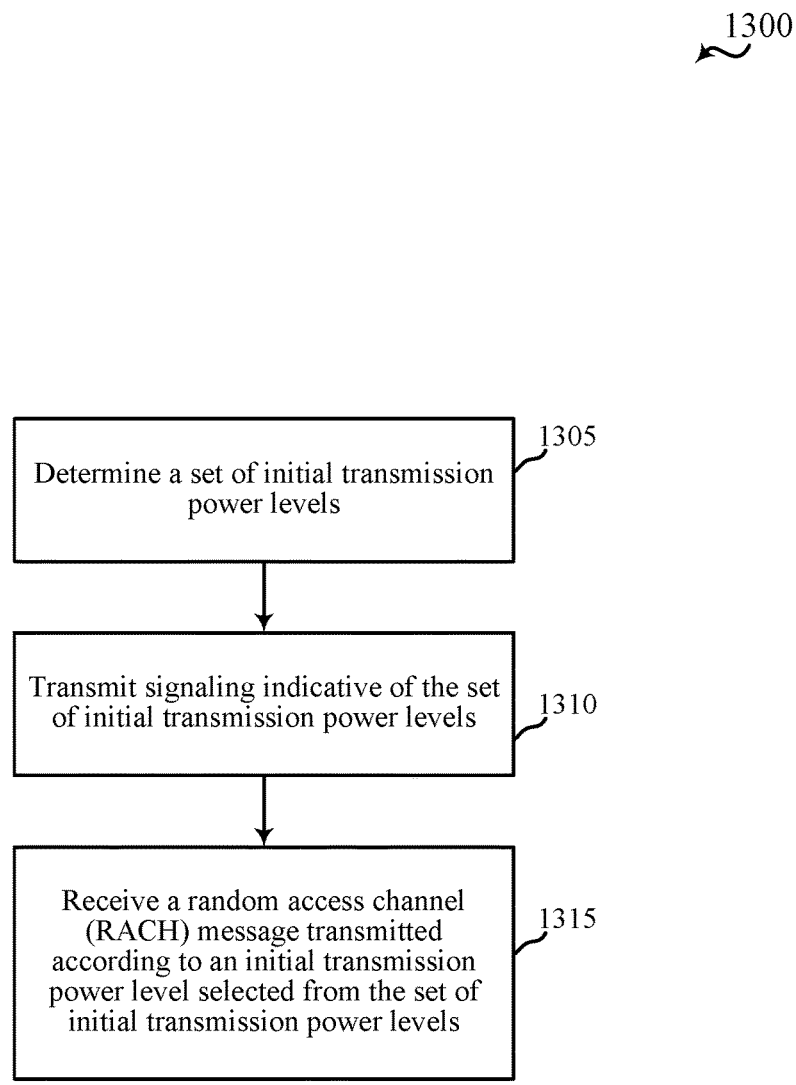
FIG. 13 shows a flowchart illustrating a method for communication with random access power level selection in accordance with various aspects of the present disclosure.

FIG. 13 shows a flowchart illustrating a method 1300 for wireless communication in accordance with various aspects of the present disclosure. The operations of method 1300 may be implemented by a wireless device (e.g., a base station 105, a wireless device 600 or a wireless device 700) or its components as described with reference to FIG. 1-8 or 10. For example, the operations of method 1300 may be performed by the random access module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1305, the method may include determining a set of initial transmission power levels, as described above with reference to FIGS. 1-5. In certain examples, the operations of block 1305 may be performed by the initial power determination module 710 as described above with reference to FIG. 7-8, or base station random access module 1010 as described above with reference to FIG. 10.

At block 1310, the method may include transmitting signaling indicative of the set of initial transmission power levels, as described above with reference to FIGS. 1-5. In certain examples, the operations of block 1310 may be performed by the transmitter module 615 as described above with reference to FIG. 6-8, or antennas 1040 and transceiver 1035 as described above with reference to FIG. 10.

At block 1315, the method may include receiving a random access channel (RACH) message transmitted according to an initial transmission power level selected from the set of initial transmission power levels, as described above with reference to FIGS. 1-5. In certain examples, the operations of block 1315 may be performed by the receiver module 605 as described above with reference to FIG. 6-8, or antennas 1040 and transceiver 1035 as described above with reference to FIG. 10.

Figure 14:
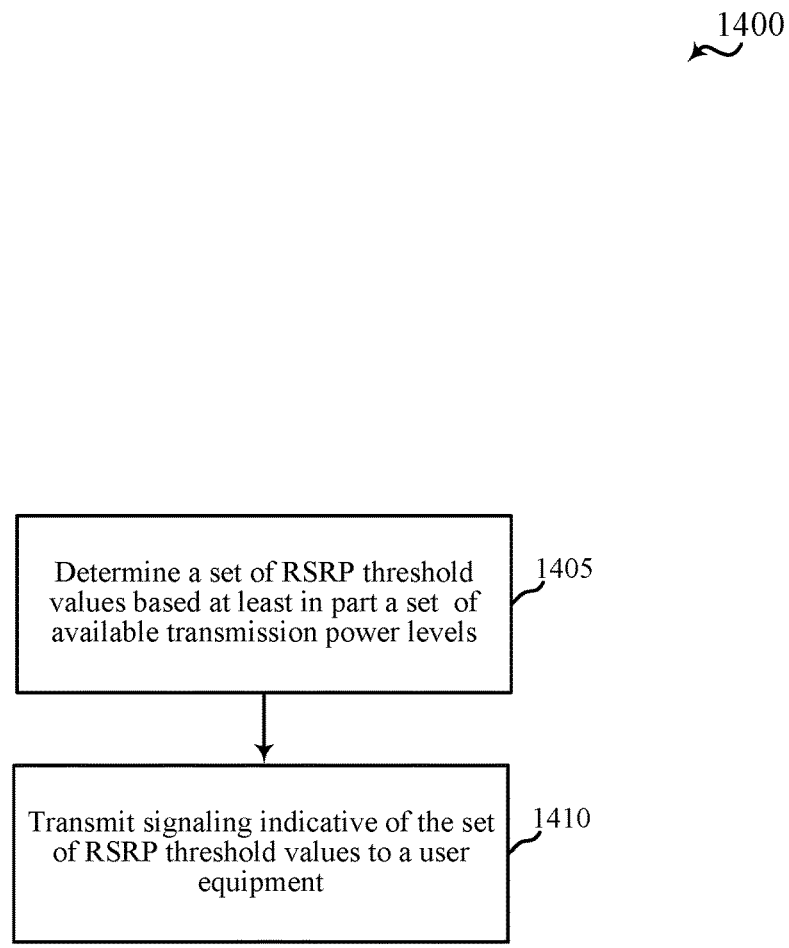
FIG. 14 shows a flowchart illustrating a method for communication with random access power level selection in accordance with various aspects of the present disclosure.

FIG. 14 shows a flowchart illustrating a method 1400 for wireless communication in accordance with various aspects of the present disclosure. The operations of method 1400 may be implemented by a wireless device (e.g., a base station 105, a wireless device 600 or a wireless device 700) or its components as described with reference to FIG. 1-8 or 10. For example, the operations of method 1400 may be performed by the random access module 610 as described with reference to FIGS. 6-9. In some examples, a wireless device may execute a set of codes to control the functional elements of the wireless device to perform the functions described below. Additionally or alternatively, the wireless device may perform aspects the functions described below using special-purpose hardware.

At block 1405, the method may include determining a set of RSRP threshold values based at least in part a set of available transmission power levels, as described above with reference to FIGS. 1-5. In certain examples, the operations of block 1405 may be performed by RSRP threshold determination module 810 as described above with reference to FIG. 8, or base station random access module 1010 as described above with reference to FIG. 10.

At block 1410, the method may include transmitting signaling indicative of the set of RSRP threshold values to a user equipment, as described above with reference to FIGS. 1-5. In certain examples, the operations of block 1410 may be performed by the transmitter module 615 as described above with reference to FIG. 6-8, or antennas 1040 and transceiver 1035 as described above with reference to FIG. 10.

Thus, methods 1100, 1200, 1300, and 1400 may provide for coverage enhancement in a wireless system. It should be noted that methods 1100, 1200, 1300, and 1400 describe possible implementation, and that the operations and the steps may be rearranged or otherwise modified such that other implementations are possible. In some examples, aspects from two or more of the methods 1100, 1200, 1300, and 1400 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, by a wireless device, signaling indicative of a set of initial transmission power levels and a set of reference signal received power (RSRP) threshold values corresponding to the set of initial transmission power levels;
   comparing, by the wireless device, an RSRP measurement to the set of RSRP threshold values;
   selecting, by the wireless device, an initial transmission power level from the set of initial transmission power levels based at least in part on the comparing; and
   transmitting, by the wireless device, a random access channel (RACH) message utilizing the initial transmission power level.

2. The method of claim 1, wherein the set of RSRP threshold values is uniquely mapped to the set of initial transmission power levels.

3. The method of claim 2, wherein the set of RSRP threshold values are based at least in part on a probability distribution function associated with the RSRP measurement or the initial transmission power levels in the set of initial transmission power levels.

4. The method of claim 1, wherein the set of RSRP threshold values comprises a number of elements that is equal to a number of elements in the set of initial transmission power levels minus one.

5. The method of claim 1, wherein the set of initial transmission power levels comprises a subset of available transmission power levels, and wherein a number of elements in the subset of available transmission power levels is less than or equal to a total number of available transmission power levels.

6. The method of claim 1, wherein the selected initial transmission power level is inversely proportional to the RSRP measurement.

7. The method of claim 1, further comprising:
   determining that the transmission of the RACH message utilizing the initial transmission power level failed;
   selecting a subsequent transmission power level from a subset of the set of initial transmission power levels, wherein the subset comprises transmission power levels that are greater than the selected initial transmission power level; and
   transmitting a subsequent RACH message utilizing the subsequent transmission power level.

8. The method of claim 1, further comprising:
transitioning from an idle mode to a connected mode; and
receiving signaling indicative of a subsequent set of initial transmission power levels, wherein the subsequent set of initial transmission power levels is the same as or different from the set of initial transmission power levels and is based at least in part on a prior successful RACH message transmission.

9. The method of claim 8, further comprising:
receiving signaling indicative of a set of RSRP threshold values based at least in part on the subsequent set of initial transmission power levels, and wherein the set of RSRP threshold values is the same as or different from an initial set of RSRP threshold values established prior to the successful RACH message transmission.

10. A method for wireless communication, comprising:
determining, by a base station, a set of initial transmission power levels and a set of reference signal received power (RSRP) threshold values corresponding to the set of initial transmission power levels;
transmitting, by the base station, signaling indicative of the set of initial transmission power levels and a set of RSRP threshold values; and
receiving, by the base station, a random access channel (RACH) message transmitted according to an initial transmission power level selected from the set of initial transmission power levels, the selected initial transmission power level being based at least in part on a comparison of an RSRP measurement to the set of RSRP threshold values.

11. The method of claim 10, wherein determining the set of initial transmission power levels comprises:
selecting a subset from a set of available transmission power levels.

12. The method of claim 10, wherein the set of RSRP threshold values are based at least in part on a probability distribution function associated with RSRP measurements or the set of initial transmission power levels.

13. The method of claim 10, wherein the set of RSRP threshold values is uniquely mapped to the set of initial transmission power levels.

14. The method of claim 10, wherein the set of RSRP threshold values comprises a number of elements that is equal to a number of elements in the set of initial transmission power levels minus one.

15. The method of claim 10, wherein the set of initial transmission power levels comprises a subset of available transmission power levels, and wherein a number of elements in the subset of available transmission power levels less than or equal to a total number of available transmission power levels.

16. The method of claim 10, further comprising:
establishing an radio resource control (RRC) connection with a user equipment;
determining a subsequent set of initial transmission power levels that is the same as or different from the set of initial transmission power levels and is based at least in part on a prior successful RACH message transmission; and
transmitting signaling indicative of the subsequent set of initial transmission power levels.

17. The method of claim 10, further comprising:
determining a subsequent set of RSRP threshold values, wherein the subsequent set of RSRP threshold values is different from the set of RSRP threshold values established prior to receiving a successful RACH message transmission; and
transmitting signaling indicative of the subsequent set of RSRP threshold values.

18. An apparatus for communication, comprising:
a processor;
memory in electronic communication with the processor; and
instructions stored in the memory; wherein the instructions are executable by the processor to cause the apparatus to:
receive signaling indicative of a set of initial transmission power levels and a set of reference signal received power (RSRP) threshold values corresponding to the set of initial transmission power levels;
compare an RSRP measurement to the set of RSRP threshold values;
select an initial transmission power level from the set of initial transmission power levels based at least in part on a comparison of the RSRP measurement to the set of RSRP threshold values; and
transmit a random access channel (RACH) message utilizing the initial transmission power level.

19. The apparatus of claim 18, wherein the set of initial transmission power levels comprises a subset of available transmission power levels, and wherein a number of elements in the subset of available transmission power levels is less than or equal to a total number of available transmission power levels.

20. The apparatus of claim 18, wherein the instructions are executable by the processor to:
determine that the transmission of the RACH message utilizing the initial transmission power level failed;
select a subsequent transmission power level from a subset of the set of initial transmission power levels, wherein the subset comprises transmission power levels that are greater than the selected initial transmission power level; and
transmit a subsequent RACH message utilizing the subsequent transmission power level.

21. The apparatus of claim 18, wherein the instructions are executable by the processor to:
transition from an idle mode to a connected mode; and
receive signaling indicative of a subsequent set of initial transmission power levels, wherein the subsequent set of initial transmission power levels is the same as or different from the set of initial transmission power levels and is based at least in part on a prior successful RACH message transmission.

22. The apparatus of claim 21, wherein the instructions are executable by the processor to:
receive signaling indicative of a set of RSRP threshold values based at least in part on the subsequent set of initial transmission power levels, and wherein the set of RSRP threshold values is the same as or different from an initial set of RSRP threshold values established prior to the successful RACH message transmission.

23. An apparatus for communication, comprising:
a processor;
memory in electronic communication with the processor; and
instructions stored in the memory; wherein the instructions are executable by the processor to cause the apparatus to:
determine a set of initial transmission power levels and a set of reference signal received power (RSRP) threshold values corresponding to the set of initial transmission power levels;

transmit signaling indicative of the set of initial transmission power levels and the set of RSRP threshold values; and receive a random access channel (RACH) message transmitted according to an initial transmission power level selected from the set of initial transmission power levels, the selected initial transmission power level being based at least in part on a comparison of an RSRP measurement to the set of RSRP threshold values.

24. The apparatus of claim 23, wherein the instructions are executable by the processor to:

select a subset from a set of available transmission power levels.

25. The apparatus of claim 23, wherein the instructions are executable by the processor to:

establish an radio resource control (RRC) connection with a user equipment;

determine a subsequent set of initial transmission power levels that is the same as or different from the set of initial transmission power levels and is based at least in part on a prior successful RACH message transmission; and transmit signaling indicative of the subsequent set of initial transmission power levels.

26. The apparatus of claim 23, wherein the instructions are executable by the processor to:

determine a subsequent set of RSRP threshold values, wherein the subsequent set of RSRP threshold values is different from an the of RSRP threshold values established prior to receiving a successful RACH message transmission; and transmit signaling indicative of the subsequent set of RSRP threshold values.

\* \* \* \* \*